United States Patent
Mulcahy et al.

(10) Patent No.: US 7,428,648 B2
(45) Date of Patent: Sep. 23, 2008

(54) POWER SUPPLY INPUT VOLTAGE INDICATOR

(75) Inventors: Luke Mulcahy, Houston, TX (US); Edward M. Reynolds, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 454 days.

(21) Appl. No.: 11/256,436

(22) Filed: Oct. 21, 2005

(65) Prior Publication Data

US 2007/0094520 A1 Apr. 26, 2007

(51) Int. Cl.
*G06F 1/00* (2006.01)
*G06F 11/00* (2006.01)

(52) U.S. Cl. .................. 713/300; 714/57; 116/200; 116/202

(58) Field of Classification Search .................. 713/300; 714/22, 57; 116/202, 200
See application file for complete search history.

(56) References Cited

U.S. PATENT DOCUMENTS

| | | | |
|---|---|---|---|
| 5,814,977 A | 9/1998 | Kim | |
| 5,962,932 A | 10/1999 | Matlo | |
| 6,376,938 B1 | 4/2002 | Williams | |
| 6,737,885 B1 | 5/2004 | Shumarayev | |
| 7,039,821 B1 * | 5/2006 | Potega | 713/340 |
| 2002/0140403 A1 | 10/2002 | Reddy | |
| 2003/0020441 A1 | 1/2003 | Yanagisawa | |
| 2003/0126477 A1 | 7/2003 | Zhang | |
| 2003/0126480 A1 | 7/2003 | Song | |
| 2004/0124237 A1 | 7/2004 | Bros | |
| 2004/0181730 A1 * | 9/2004 | Monfared et al. | 714/745 |
| 2005/0127757 A1 | 6/2005 | Wilson | |

* cited by examiner

*Primary Examiner*—Mark Connolly

(57) ABSTRACT

In one embodiment, a circuit to indicate a match between a user-selectable power setting and an input voltage, comprises a first circuit node connected to a power source at an input voltage level, a second circuit node, a switch to switch the first circuit node and the second circuit node between a first position associated with a first voltage and a second position associated with a second voltage, and a first indicator coupled to the first circuit node and the second circuit node and activated when the switch is set in a position that corresponds to the input voltage level.

17 Claims, 3 Drawing Sheets

Input Voltage

|  |  | 230 | 115 |
|---|---|---|---|
| Switch Position | 230 | LED 150 Active<br>LED 152 Inactive | LED 152 Active<br>LED 150 Inactive |
|  | 115 | LED 152 Active<br>LED 150 Inactive | LED 150 Active<br>LED 152 Inactive |

POWER SUPPLY INPUT VOLTAGE INDICATOR

TECHNICAL FIELD

This application relates to power supplies for electronic equipment, and more particularly to a power supply input voltage indicator.

BACKGROUND

Electronic devices such as, for example, computers (PCs), laptop computers, personal digital assistants (PDAs) and the like may include, or be connected to, one or more power supplies. Among other functions, a power supply may convert alternating current (AC) power to direct current (DC) power at a voltage level for which the circuitry of the electronic device is designed.

AC power is transmitted through commercial power grids at high voltages and transformed to lower voltage, typically 115V or 230V, to power outlets. Power supplies may include a device that can transform power from a power source at 115V, 230V, or other voltages to DC power at a voltage suitable for an electronic device. A power supply that is set to an incorrect input voltage level may cause the electronic device to fail, or to operate improperly. Therefore, an indicator of the power supply voltage setting is useful.

SUMMARY

In one embodiment, a circuit to indicate a match between a user-selectable power setting and an input voltage, comprises a first circuit node connected to a power source at an input voltage level, a second circuit node, a switch to switch the first circuit node and the second circuit node between a first position associated with a first voltage and a second position associated with a second voltage, and a first indicator coupled to the first circuit node and the second circuit node and activated when the switch is set in a position that corresponds to the input voltage level.

DETAILED DESCRIPTION

Described herein is an exemplary power supply input voltage indicator adapted for use in electronic devices such as, for example, in a computer system. The power supply input voltage indicator described herein may be implemented in circuitry that may be coupled to a power supply.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Figures 1, 2:
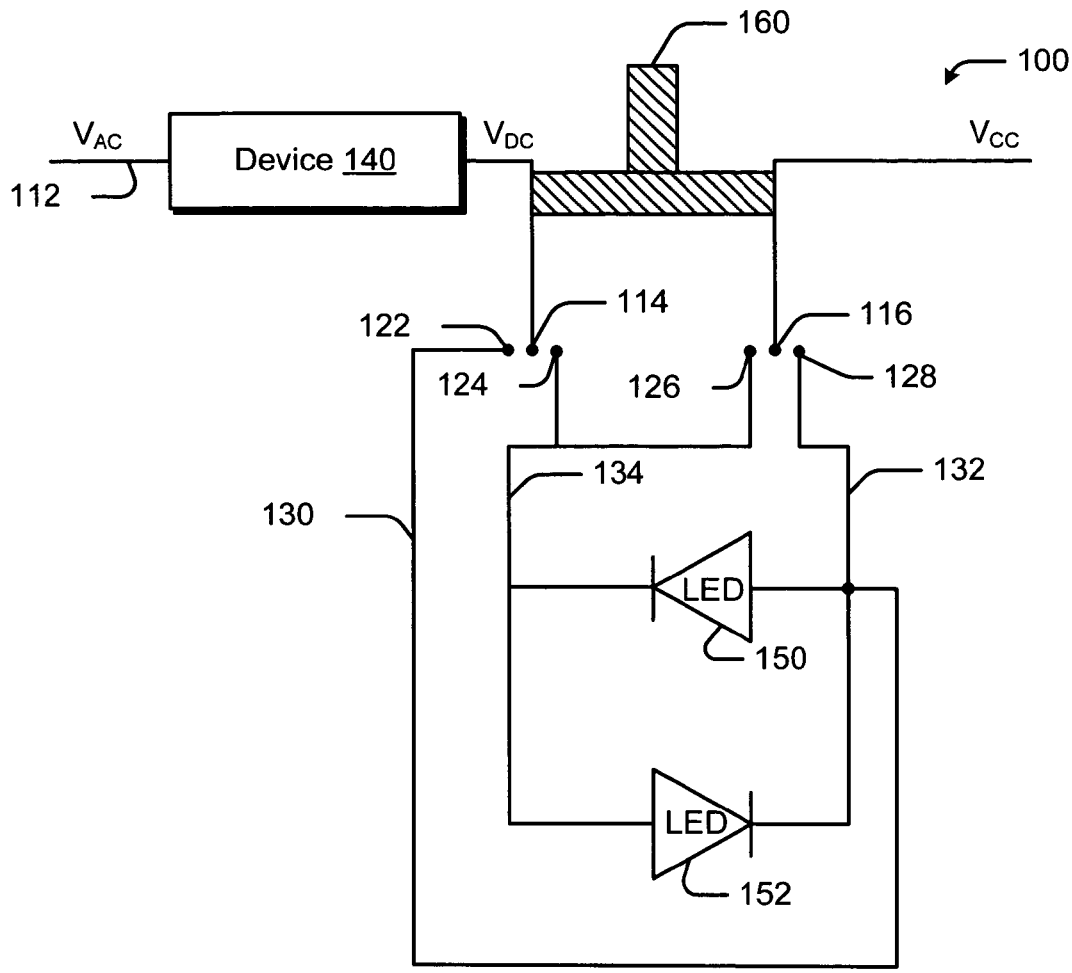
FIG. 1 is a schematic illustration of one embodiment of a power supply input voltage indicator circuit.
FIG. 2 is a state table for the power supply input voltage indicator circuit of FIG. 1.

FIG. 1 is a schematic illustration of one embodiment of a power supply input voltage indicator circuit 100. Referring to FIG. 1, circuit 100 receives electrical power at an input voltage $V_{AC}$ on line 112. In one embodiment, the electrical power input at line 112 may be an alternating current (AC) $V_{AC}$ may be an input from a commercial power source at either $115 V_{AC}$ or $230 V_{AC}$, although other voltages may be received on line 112. A device 140 coupled to line 112 transforms the input power from an AC voltage to a direct current (DC) power at a voltage level adapted for use with an electrical device such as, e.g., a computer. In embodiments, device 140 may be embodied as an AC/DC power converter.

Device 140 generates a voltage $V_{DC}$ at circuit node 114. Circuit node 116 is coupled to a reference voltage $V_{CC}$. In one embodiment, reference voltage may $V_{CC}$ correspond to a design voltage for circuitry of an electronic device. By way of example and not limitation, in embodiments, $V_{CC}$ may be implemented as $3.3V_{DC}$, $5 V_{DC}$, or $12 V_{DC}$.

In one embodiment, circuit nodes 114 and 116 may be coupled to a switch 160 to switch nodes 114 between a first position, in which node 114 is electrically coupled to node 122 and node 116 is electrically coupled to node 126, and a second position, in which node 114 is electrically coupled to node 124 and node 116 is electrically coupled to node 128.

Circuit 100 comprises diodes 150 and 152. Node 122 provides an electrical path to node 126 via line 130 to diode 150, then via line 134. Node 124 provides an electrical path to node 128 via line 134 to diode 152, then via line 132.

In one embodiment, supply voltage indicator circuit 100 may be adapted to provide a visual indication of whether the power supply circuit is set to transform the input power at the input voltage. By way of example, switch 160 may be used to switch device 140 between a first state, adapted to transform an AC at $115 V_{AC}$, and a second state adapted to transform an AC current at $230 V_{AC}$. Diodes 150, 152 may be embodied as light emitting diodes (LEDs). In one embodiment LED 150 may be embodied as a green LED, while LED 152 may be embodied as an amber (i.e., yellow) or red LED. In this embodiment, LED 150 is activated to provide a visual indicator when the power setting of the device 140 is set to a state that matches the input power and LED 152 is activated to provide a visual indicator when the power setting of the device 140 is set to a state that fails to match the input power. In an alternate embodiment, LEDs 150, 152 may be embodied as a single, dual color LED that illuminates amber (i.e., yellow) or red when current flows through the LED as indicated in LED 152, and green when current flows through the LED as indicated in LED 150.

For purposes of explanation, in the embodiment depicted in FIG. 1, switch 160 may be movable between a first position to convert input power at $230 V_{AC}$ and a second position to convert input power at $115V_{AC}$. In the first position, node 114 is electrically coupled with node 122 and node 116 is electrically coupled to node 126. In the second position, node 114 is electrically coupled with node 124 and node 116 is electrically coupled with node 128.

In one embodiment node 116 is coupled to a reference voltage, which may correspond to the supply voltage $V_{CC}$ for the electronic device. In one embodiment, supply voltage $V_{CC}$ may be supplied by a battery. In one embodiment, the input AC current is converted in a linearly proportional manner into a DC voltage between $0V_{DC}$ and a voltage that is 1.3 times $V_{CC}$. For purposes of explanation, in one embodiment the supply voltage $V_{CC}$ may be 5V. Device 140 converts the AC power input into a DC current in a voltage range between $0V_{DC}$ and a voltage and $6.5 V_{DC}$.

FIG. 2 is a state table for the power supply input voltage indicator circuit of FIG. 1 in for input voltages of $115V_{AC}$ and $230V_{AC}$ and a supply voltage $V_{CC}$ of $5V_{DC}$. Operation of the circuit 100 will be explained with reference to FIGS. 1 and 2.

When the input voltage is $230V_{AC}$, device 140 generates a voltage of 6.5V at node 114. Hence, $V_{DC}$ is greater than $V_{CC}$. When switch 160 is set in the first position (i.e., for 230V), node 114 is electrically coupled with node 122 and node 116 is electrically coupled with node 126. Hence, current flows from node 122 through line 130, and through LED 150 to node 126. Hence LED 150 is activated and LED 152 remains inactivate.

By contrast, when switch 160 is set in the second position (i.e., for 115V), node 114 is electrically coupled with node 124 and node 116 is electrically coupled with node 126. Hence, current flows from node 124 through line 134, and through LED 152 to node 128. Hence LED 152 is activated and LED 150 remains inactive.

When the input voltage is $115V_{AC}$, device 140 generates a voltage of approximately 3.25V at node 114. Hence, $V_{DC}$ is less than $V_{CC}$. When switch 160 is set in the first position (i.e., for 230V), node 114 is electrically coupled with node 122 and node 116 is electrically coupled with node 126. Hence, current flows from node 126 through LED 152 to line 130, and to node 122. Hence LED 152 is activated and LED 150 remains inactive.

By contrast, when switch 160 is set in the second position (i.e., for 115V), node 114 is electrically coupled with node 124 and node 116 is electrically coupled with node 126. Hence, current flows from node 120 through line 132, and through LED 150 to line 135 and node 124. Hence LED 150 is activated and LED 152 remains inactive.

Thus, circuit 100 provides a visual indicator of whether the power supply setting corresponds to the input power. More particularly, LED 150 is activated when the power supply setting matches the input power, while LED 152 is activated when the power supply setting fails to match the input power.

In alternate embodiments, an audible indicator may be implemented in place of, or in conjunction with, the visual indicator provided by LEDs 150, 152. By way of example, an alarm may be coupled to LED 152 to provide an audible notice that the power supply setting does not match the input power supply. Alternatively, a first alarm may be coupled to LED 150 and a second alarm may be coupled to LED 152.

Figure 3:
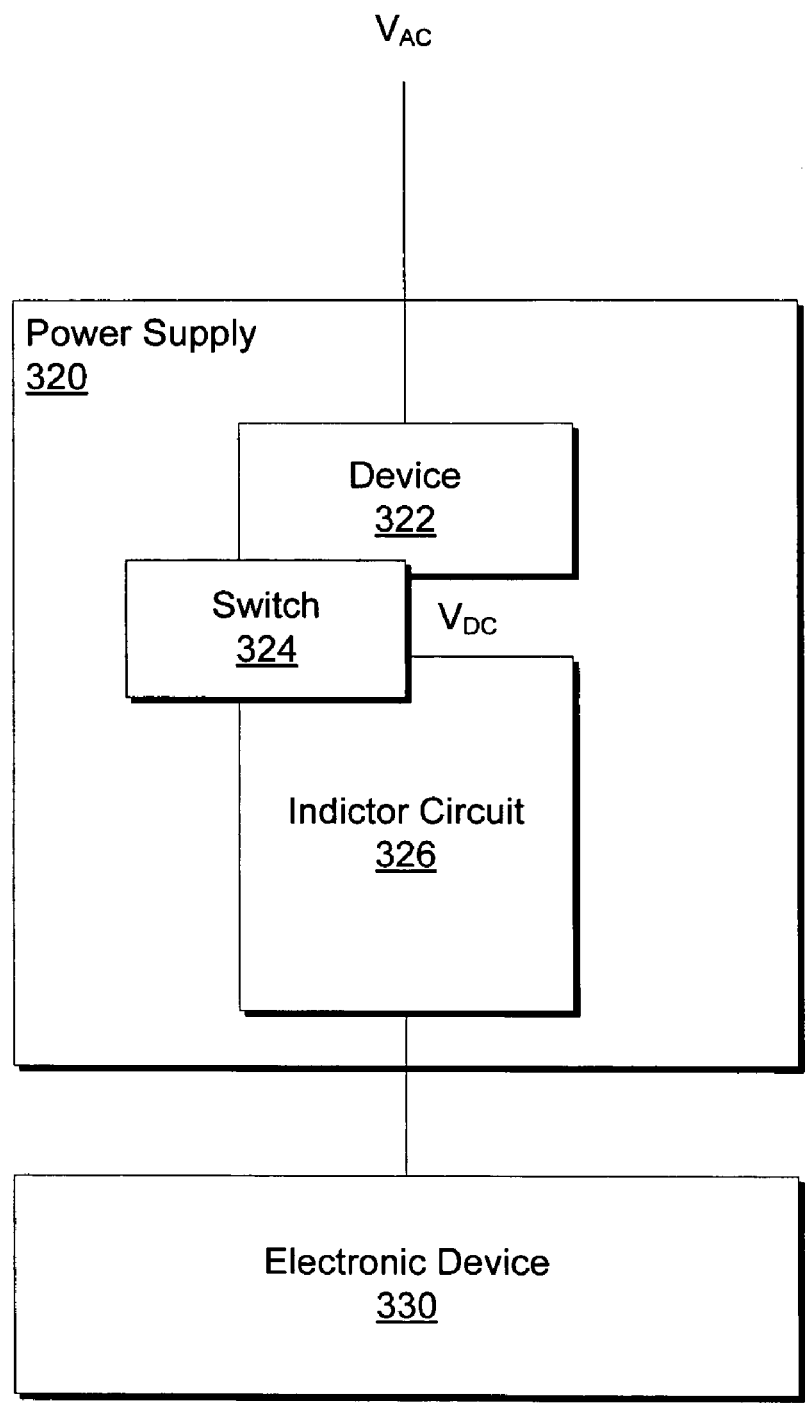
FIG. 3 is a schematic illustration of one embodiment of a power supply.

FIG. 3 is a schematic illustration of one embodiment of a power supply 320. Referring to FIG. 3, power supply 320 may include a device to convert AC power from a power source to a DC power supply. Power supply 320 may further include an indicator circuit 326 and a switch 324 coupled to the device 322 and the indicator circuit 326. In one embodiment, the switch 324 and indicator circuit 326 may be constructed substantially in accord with the embodiment depicted in FIG. 1.

Figure 4:
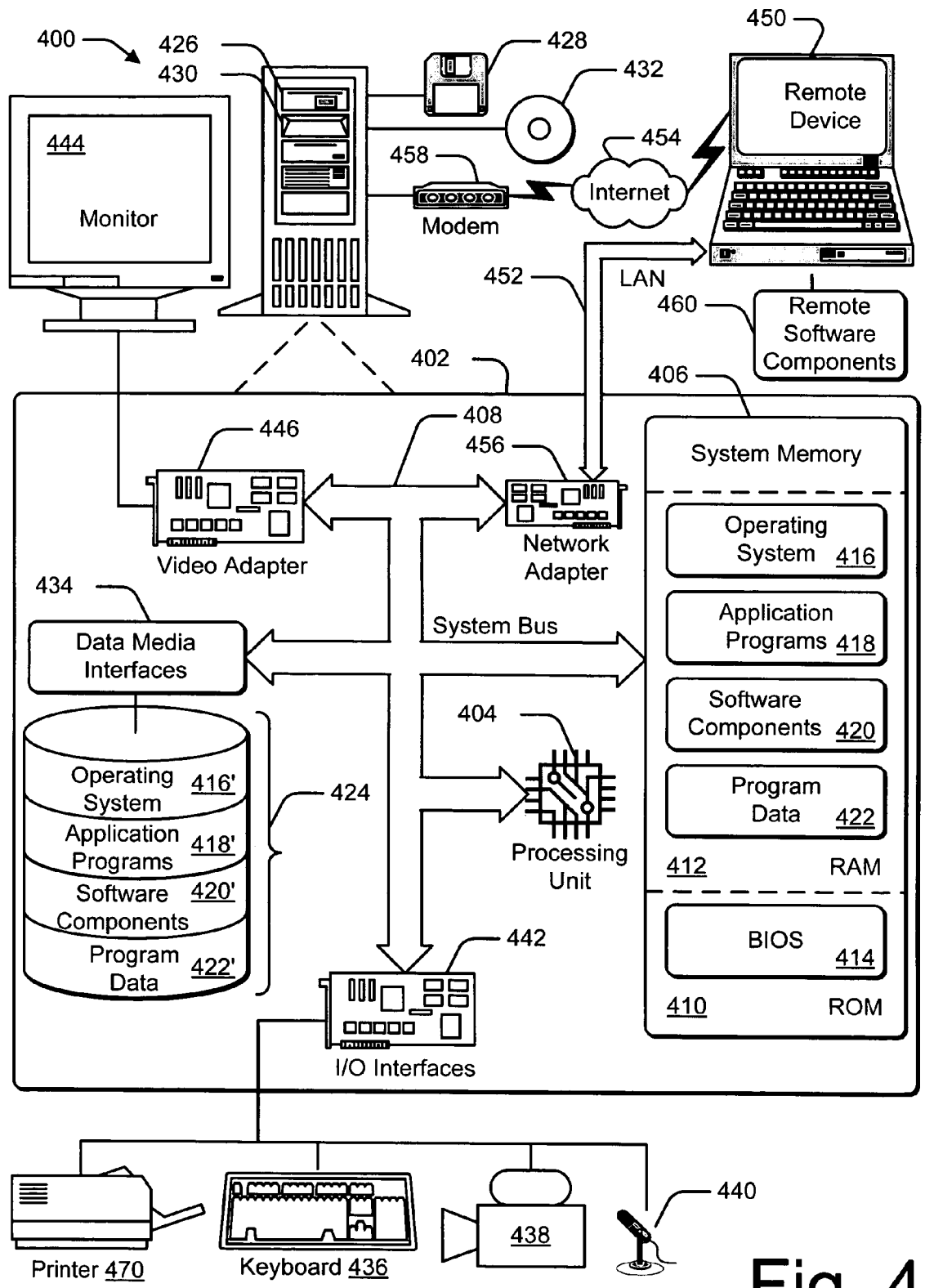
FIG. 4 is a schematic illustration of one embodiment of a computer system.

Power supply 320 may be coupled to an electronic device 330. In one embodiment, electronic device 330 may be embodied as a personal computer, server, laptop computer, or the like. FIG. 4 is a schematic illustration of one embodiment of a computer system.

With reference to FIG. 4, the components of computer 400 may include, but are not limited to, a processing unit 404, a system memory 406, and a system bus 408 that couples various system components including the system memory 406 to the processing unit 404. The system bus 408 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

The system memory 406 includes computer storage media in the form of volatile and/or nonvolatile memory such as read only memory (ROM) 410 and random access memory (RAM) 412. A basic input/output system 414 (BIOS), containing the basic routines that help to transfer information between elements within computer 400, such as during start-up, is typically stored in ROM 410. RAM 412 typically contains data and/or program modules that are immediately accessible to and/or presently being operated on by processing unit 404. By way of example, and not limitation, FIG. 4 illustrates operating system 416, application programs 418, other software components 420, and program data 422.

The computer 400 may also include other removable/non-removable, volatile/nonvolatile computer storage media. By way of example only, the computer system of FIG. 4 may include a hard disk drive 424 that reads from or writes to non-removable, nonvolatile magnetic media, a magnetic disk drive 426 that reads from or writes to a removable, nonvolatile magnetic disk 428, and an optical disk drive 430 that reads from or writes to a removable, nonvolatile optical disk 432 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 424 is typically connected to the system bus 408 through a non-removable memory interface such as data media interface 434, and magnetic disk drive 426 and optical disk drive 430 are typically connected to the system bus 408 by a removable memory interface.

The drives and their associated computer storage media discussed above and illustrated in FIG. 4 provide storage of computer-readable instructions, data structures, program modules, and other data for computer 400. In FIG. 4, for example, hard disk drive 424 is illustrated as storing operating system 416', application programs 418', software components 420', and program data 422'. Note that these components can either be the same as or different from operating system 416, application programs 418, software components 420, and program data 422. Operating system 416, application programs 418, other program modules 420, and program data 422 are given different numbers here to illustrate that, at a minimum, they are different copies. A user may enter commands and information into the computer 400 through input devices such as a keyboard 436 and pointing device 438, commonly referred to as a mouse, trackball, or touch pad. Other input devices (not shown) may include a microphone 440, joystick, game pad, satellite dish, scanner, or the like. These and other input devices are often connected to the processing unit 404 through an input/output (I/O) interface 442 that is coupled to the system bus, but may be connected by other interface and bus structures, such as a parallel port, game port, or a universal serial bus (USB). A monitor 444 or other type of display device is also connected to the system bus 406 via an interface, such as a video adapter 446. In addition to the monitor 444, computers may also include other peripheral output devices (e.g., speakers) and one or more printers 470, which may be connected through the I/O interface 442.

The computer may operate in a networked environment using logical connections to one or more remote computers, such as a remote computing device 450. The remote computing device 450 may be a personal computer, a server, a router, a network PC, a peer device or other common network node, and typically includes many or all of the elements described above relative to computer 400. The logical connections depicted in FIG. 4 include a local area network (LAN) 452 and a wide area network (WAN) 454. Although the WAN 454 shown in FIG. 4 is the Internet, the WAN 454 may also include other networks. Such networking environments are commonplace in offices, enterprise-wide computer networks, intranets, and the like.

When used in a LAN networking environment, the computer 400 is connected to the LAN 452 through a network interface or adapter 456. When used in a WAN networking environment, the computer 400 typically includes a modem 458 or other means for establishing communications over the Internet 454. The modem 458, which may be internal or external, may be connected to the system bus 406 via the I/O interface 442, or other appropriate mechanism. In a networked environment, program modules depicted relative to the computer 400, or portions thereof, may be stored in the remote computing device 450. By way of example, and not limitation, FIG. 4 illustrates remote application programs 460 as residing on remote computing device 450. It will be appreciated that the network connections shown are exemplary and other means of establishing a communications link between the computers may be used.

Hence, described herein are exemplary circuits to indicate a match between a user-selectable power setting and an input voltage, and power supplies and computers including such circuits. Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A circuit to indicate a match between a user-selectable power setting and an input voltage, comprising:
    a first circuit node connected to a power source at an input voltage level;
    a second circuit node;
    a switch to switch the first circuit node and the second circuit node between a first position associated with a first voltage and a second position associated with a second voltage; and
    a first indicator coupled to the first circuit node and the second circuit node and activated when the switch is set in a position that corresponds to the input voltage level.

2. The circuit of claim 1, further comprising a second indicator coupled to the first circuit node and the second circuit node and activated when the switch is set in a position that fails to correspond to the input voltage level.

3. The circuit of claim 1, further comprising a converter coupled to the first circuit node to transform an alternating current (AC) input into a direct current (DC) input.

4. The circuit of claim 3, wherein the first indicator is activated when:
    the second circuit node is connected to a reference voltage level;
    the switch is set to a first position associated with a low input voltage; and
    the converter generates a DC input that is less than the reference voltage level.

5. The circuit of claim 3, wherein the first indicator is activated when:
    the second circuit node is connected to a reference voltage level;
    the switch is set to a second position associated with a high input voltage; and
    the converter generates a DC input that is greater than the reference voltage level.

6. A power supply for an electronic device, comprising:
    an input node to receive an alternating current (AC) input;
    a converter coupled to the input node to transform the AC input into a direct current (DC) input;
    an indicator circuit coupled to the power supply to indicate a match between a user-selectable power setting on the power supply and an input voltage;
    a first circuit node connected to a power source at an input voltage level;
    a second circuit node;
    a switch to switch the first circuit node and the second circuit node between a first position associated with a first voltage and a second position associated with a second voltage; and
    a first indicator coupled to the first circuit node and the second circuit node and activated when the switch is set in a position that corresponds to the input voltage level.

7. The power supply of claim 6, wherein the indicator circuit further comprises a second indicator coupled to the first circuit node and the second circuit node and activated when the switch is set in a position that fails to correspond to the input voltage level.

8. The power supply of claim 6, wherein the first indicator is activated when:
    the second circuit node is connected to a reference voltage level;
    the switch is set to a first position associated with a low input voltage; and
    the converter generates a DC input that is less than the reference voltage level.

9. The power supply of claim 6, wherein the first indicator is activated when:
    the second circuit node is connected to a reference voltage level;
    the switch is set to a second position associated with a high input voltage; and
    the converter generates a DC input that is greater than the reference voltage level.

10. A computer system, comprising:
    one or more input/output devices;
    a processor; and
    a power supply for an electronic device, the power supply comprising:
        an input node to receive an alternating current (AC) input;
        a converter coupled to the input node to transform the AC input into a direct current (DC) input;
        an indicator circuit coupled to the power supply to indicate a match between a user-selectable power setting on the power supply and an input voltage, wherein the indicator circuit comprises:
    a first circuit node connected to a power source at an input voltage level;
    a second circuit node;
    a switch to switch the first circuit node and the second circuit node between a first position associated with a first voltage and a second position associated with a second voltage; and a first indicator coupled to the first circuit node and the second circuit node and activated when the switch is set in a position that corresponds to the input voltage level.

11. The computer system of claim 10, wherein the indicator circuit further comprises a second indicator coupled to the first circuit node and the second circuit node and activated when the switch is set in a position that fails to correspond to the input voltage level.

12. The computer system of claim 11, wherein the first indicator is activated when:
- the second circuit node is connected to a reference voltage level;
- the switch is set to a first position associated with a low input voltage; and
- the converter generates a DC input that is less than the reference voltage level.

13. The computer system of claim 11, wherein the first indicator is activated when:
- the second circuit node is connected to a reference voltage level;
- the switch is set to a second position associated with a high input voltage; and
- the converter generates a DC input that is greater than the reference voltage level.

14. A power supply for an electronic device, comprising:
- an input node to receive an alternating current (AC) input;
- a converter coupled to the input node to transform the AC input into a direct current (DC) input;
- indicating means for indicating a match between a user-selectable power setting on the power supply and an input voltage, wherein the indicating means comprises:
  - a first circuit node connected to a power source at an input voltage level;
  - a second circuit node;
  - a switch to switch the first circuit node and the second circuit node between a first position associated with a first voltage and a second position associated with a second voltage; and
  - a first indicator coupled to the first circuit node and the second circuit node and activated when the switch is set in a position that corresponds to the input voltage level.

15. The power supply of claim 14, wherein the indicator circuit further comprises a second indicator coupled to the first circuit node and the second circuit node and activated when the switch is set in a position that fails to correspond to the input voltage level.

16. The power supply of claim 14, wherein the first indicator is activated when:
- the second circuit node is connected to a reference voltage level;
- the switch is set to a first position associated with a low input voltage; and
- the converter generates a DC input that is less than the reference voltage level.

17. The power supply of claim 14, wherein the first indicator is activated when:
- the second circuit node is connected to a reference voltage level;
- the switch is set to a second position associated with a high input voltage; and
- the converter generates a DC input that is greater than the reference voltage level.

\* \* \* \* \*